United States Patent [11] 3,622,650

[72] Inventors Gregor Berstein
Newton;
Bram B. Boonstra, Sharon, both of Mass.
[21] Appl. No. 796,541
[22] Filed Feb. 4, 1969
[45] Patented Nov. 23, 1971
[73] Assignee Cabot Corporation
Boston, Mass.

[54] RUBBER REINFORCING COMPOSITIONS
12 Claims, No Drawings
[52] U.S. Cl. .................................................. 260/763,
106/288 B, 106/307, 106/309, 241/5, 260/766
[51] Int. Cl. ...................................................... C08l 17/08,
C08c 11/10, C08c 11/18
[50] Field of Search ........................................... 106/307,
288 B, 309; 260/763, 766; 241/5

[56] References Cited
UNITED STATES PATENTS
2,821,232  1/1958  Wolf ............................. 260/763

3,317,145  5/1967  Stephanoff ..................... 241/5
3,333,979  8/1967  Milligan ........................ 106/307
3,390,006  6/1968  Takewell et al ................ 106/307
3,416,739  12/1968  Salonish ........................ 241/5
3,495,999  2/1970  Hagopian ...................... 106/307

OTHER REFERENCES
Kraus–Reinforcement of Elastomers (Interscience) (N.Y.) (1965), pages 324– 326 and 410– 411. TS 1925 K7

*Primary Examiner*— Allan Lieberman
*Assistant Examiner*— H. H. Fletcher
*Attorneys*— Kenneth W. Brown, Arthur S. Collins, Barry R. Blaker and Lawrence H. Chaletsky ABSTRACT: Superior rubber reinforcing compositions comprising mixtures of carbon black and silica are provided by fluid energy milling of the combined ingredients. Among other attributes the resulting reinforcing composition display improved cut growth resistance characteristics in natural rubber formulations.

3,622,650

RUBBER REINFORCING COMPOSITIONS

The PRIOR ART

The art of incorporating carbon black into curable natural rubber formulations for the purposes of extension and reinforcement of such formulations has been extensively practiced and developed. In recent years there has been an ever increasing need to develop reinforced natural rubber tread stocks which possess markedly better cut growth resistance properties than heretofore available. Said need is directly attributable, to a large extent, to the advances in numbers and usage of earth moving machinery and other heavy construction equipment which are inherently utilized in off-the-road applications. The tires of such machinery are obviously subject to repeated heavy traumatizing loads during use. Thus, when such heavy equipment is moved over unimproved work sites, the tires thereof are subject to rock strikes, chuckholes, etc., which tend to tear and/or cut rather than abrade the tread stock. Thus, there has developed an intensive search for natural rubber compositions which (2) are not readily cut and/or torn to failure, and (2) when so torn or cut, minimize the extent to which the cut can propogate. One method for providing this beneficial natural rubber property resides in the use of rubber reinforcement compositions consisting essentially of mixtures of carbon black and a colloidal precipitated type of silica. In accordance with the present invention there has been discovered an improved method for the production of such compositions which, when utilized in natural rubber formulations, result not only in substantial improvements in the cut growth resistance thereof but also can provide improvements in various other desirable properties of such rubber formulations.

Accordingly, it is a principal object of the present invention to provide improved carbon black/silica compositions suitable for use in the reinforcement of natural rubber stocks.

It is another object of the present invention to provide carbon black/silica compositions having unusually good dispersion properties in natural rubber applications.

It is another object of the present invention to provide a novel process for the production of improved carbon black/silica compositions.

It is still another object of the invention to provide natural rubber compositions having improved cut growth resistance characteristics.

Other objects and advantages of the instant invention will in part be obvious and will in part appear hereinafter.

GENERAL DESCRIPTION OF THE INVENTION

In accordance with the present invention it has been discovered that improved carbon black/silica reinforcing compositions are produced when carbon black and precipitated silica mixtures are treated by fluid energy milling. It is all important that the carbon black and silica be associated with one another at the time of such milling; otherwise, much, if not all of the cut growth resistance advantages accruing to the present invention are either substantially depressed or lost entirely.

DETAILED DESCRIPTION OF THE INVENTION

The finely divided particulate silicas utilized in the compositions of the present invention are normally those particulate silicas produced by precipitation from alkali metal silicate solution having BET-$N_2$ surface areas of between about 50 m.$^2$/gram and about 250 m.$^2$/gram and preferably between about 75 m.$^2$/gram and about 150 m.$^2$/gram. The generalized process by which such precipitated silicas are produced is as follows: a solution of an alkali metal silicate is neutralized or acidulated with an acidic reactant under controlled conditions to precipitate discrete amorphous silica particles from solution. This hydrous amorphous silica is then separated from the liquid reaction medium, washed free from byproduct soluble salts and dried to solid form. The resulting silica, normally in cake form, is then suitably ground, such as by hammer or roll milling, to an extremely fine, impalpable, colloidal particulate solid. The precipitated silicas of the present invention are distinguishable from silica gels by their relative lack of porosity as compared to said silica gels. In turn, this lack of porosity is signalled by the relatively lower BET-$N_2$ surface areas of the silicas of instant interest as compared to those of silica gels wherein surface areas of greater than about 300 m.$^2$/gram and usually above about 500 m.$^2$/gram are usually encountered.

The carbon blacks utilized in the production of the carbon black/silica filler compositions are generally characterized by their mode of manufacture and their "structure" qualities. Generally speaking such blacks can be produced by the channel or "impingement" process or by way of the furnace process. While channel blacks are normally suited to the task, the use of such blacks is normally subservient to that of the furnace blacks due primarily to considerations of economy. Accordingly, the carbon blacks of interest which are useful in the formation of the carbon black/silica compositions of the invention are those channel or furnace blacks having a specific surface area (BET-$N_2$) of between about 30 and about 150 m.$^2$/gram, an average primary particle diameter of between about 20 and about 75 millimicrons as observed by electron microscopy and an oil absorption factor of at least about 50 cc. of dibutyl phthalate per 100 grams of the fluffy black. The oil absorption factor of a carbon black is generally considered by those skilled in that art as being roughly proportional to the "structure" of the black. In turn, "structure" is that property of a black which signifies the extent to which primary black particles tend to form chainlike structure. Accordingly, the higher the "structure" of a carbon black, all other factors being equal, the greater the reinforcement capability thereof when suitable dispersed into a rubber formulation. For this reason, therefore, blacks having an oil absorption factor of greater than about 70 cc. of dibutyl phthalate per 100 grams of the fluffy black are greatly preferred in the compositions of the instant invention.

Generally speaking, the compositions of interest comprise between about 10 and about 50 weight percent of the silica component and between about 90 and about 50 percent of the carbon black component. The relative amounts of the two constituents present, however, is normally not critical. Mixtures of carbon black and silica currently commonly utilized in commerce for natural rubber applications generally constitute about 30 percent silica and about 70 percent carbon black.

It should be further borne in mind that many carbon blacks and precipitated silicas of commerce are available in pelleted form. Such pelletization of the ordinarily fluffy materials is often accomplished to provide handling ease and reduce the amount of dusting usually attendant in the handling of the fluffy materials. Such pelleted silicas and carbon blacks are well suited for the formation of the reinforcing compositions of the invention.

As mentioned hereinbefore, it is important that the carbon black and silica be admixed prior to or during the fluid energy milling of the compositions. Thus, one suitable method for forming the mixture of silica and carbon black constituents, particularly when said compositions are utilized in the aforedescribed pelleted form, comprises metering each constituent separately and continuously into the fluid energy milling device thereby performing the mixture therewithin. When, however, the carbon black and silica constituents are to be used in fluffy form, it will normally be preferred that admixture of said constituents be undertaken prior to the fluid energy milling thereof. Such admixture can be performed quite simply, such as by tumble mixing of predetermined quantities thereof. It should be noted that when the silica and carbon black are separately fluid energy milled and only thereafter formed into a reinforcing composition mixture, much of the cut growth resistance improvement available in practice of the instant invention is substantially degraded as will be demonstrated in the examples forming part hereof.

By fluid energy milling it is meant generally the process by which particulate solids are caused to impact at high velocity against hard surfaces and/or each other while flowing through a confined chamber under the influence of one or more fast moving and very turbulent gas streams. Many types of apparatus for accomplishing fluid energy milling suitable for the purposes of the present invention are known to the art.

In one class of suitable apparatus, a gas is admitted in high-velocity streams at an angle around a portion or all of the periphery of a grinding and/or classifying chamber means and the subject solids fed thereinto. The solids course around the periphery of the chamber and the turbulence and rotational energy imparted to the solids by said high-velocity gas streams results in a high degree of milling of the solid particles. Exemplary of this type of apparatus are the Micronizer, produced by Sturtevant Mill Corporation; Jet Pulverizer, produced by Jet Pulverizer Company; Jet-O-Mizer, Fluid Energy Processing and Equipment Company; and the Reductionizer, Reduction Engineering Corporation. In another well-known class of fluid energy milling equipment, the subject solids are conveyed into suitable chamber means wherein at least two high-velocity streams impact upon each other. This last-mentioned class of milling apparatus is exemplified by the Majac Mill, Majac Incorporated.

The operations of fluid energy milling equipment are generally well understood by those skilled in the art and need not be discussed in detail here. However, it should be noted that the gases utilized for fluid energy milling are generally air or stream, both of which are suitable for milling the silicas in accordance with the process of the invention. Obviously, however, other gases are also suitable, provided, of course, that deleterious reaction with the silica and/or carbon black is avoided. Thus, such gases as nitrogen, carbon dioxide, argon, neon, carbon black furnace flue gases and the like can also be normally utilized if desired. A detailed account of fluid energy milling equipment and operations thereof can be had when reference is made to Perry's *Chemical Engineering Handbook*, Fourth Edition, McGraw-Hill Book Company, 1963, 8:42–43.

The extent to which the carbon black/silica composition is fluid energy milled is subject to considerable variation. Generally, sufficient milling energy should be imparted to the composition such that the apparent density of the fluffy fluid energy milled composition is less than about 9 lbs./ft.$^3$. For purposes of comparison, the apparent densities of the useful precipitated silicas of commerce are generally above about 10 lbs./ft.$^3$. The carbon blacks of interest, depending markedly upon their physical form (pelleted or fluffy), also generally have apparent densities of above about 10 lbs./ft.$^3$.

Subsequent to the milling step the fluid energy milled carbon black/silica compositions of the instant invention can be further treated as desired to render them even more desirable for their end use applications. For instance, again striking at the hereinabove-mentioned problem of handling fluffy colloidal particles without substantial detrimental dusting and metering phenomena, it is often desirable to pelletize the milled compositions of the invention.

The compositions of the present invention can be utilized in natural rubber formulations in amounts representing between about 30 and about 85 percent percent by weight of the rubber content thereof. Generally speaking, the combined reinforcing agents of the instant invention will find maximum utility in natural rubber tread stocks when utilized amounts representing between about 50 and about 70 percent by weight of the natural rubber content of the completed formulation. With respect to the foregoing, however, it should be noted that the reinforcing agents of the invention can be dispersed into the natural rubber matrix in any suitable manner. Thus, said agents can be dispersed into the natural rubber matrix or latex to their final concentration in single or plural dispersion steps or, alternatively, may be first dispersed at relatively high loadings into a natural rubber masterbatch (up to about 85 percent solids by weight of the rubber content) after which said masterbatch can then be let down to end use concentrations of the reinforcing agent by the additional dispersion therewith of further amounts of natural rubber.

There follow a number of illustrative nonlimiting examples:

EXAMPLE 1

A series of sample carbon black/silica compositions comprising about 35 weight percent silica and about 65 weight percent carbon black were produced utilizing an ISAF pelleted oil furnace carbon black having an average ultimate particle diameter of about 23 millimicrons, a BET-$N_2$ surface area of about 115 m.$^2$/gram, a dibutyl phthalate oil absorption factor of about 175 cc./100 grams and an apparent density of about 22/lbs./ft.$^3$ and a pelleted precipitated colloidal silica having a BET-$N_2$ surface area of about 125 m.$^2$/gram and an apparent density of about 16 lbs./ft.$^3$.

In series A the carbon black and silica constituents were admixed by charging thereof into a rotating drum and tumbling the combined ingredients for about one-half hour.

In series B the mixing of ingredients was accomplished as in series A. However, subsequent to the mixing step, the resulting composition was fluid energy milled in a 4-inch micronizer at a feed rate of about 6 lbs./hour and utilizing room temperature air as the grinding medium at an input pressure of about 90 p.s.i.g. at the feed nozzle and of 85 p.s.i.g. at the grinding jets. The product carbon black/silica composition had an apparent density of about 7 lbs./ft.$^3$.

In series C essentially the same procedure as utilized in series B was employed with the exception that mixture of the silica and carbon black was achieved within the fluid energy milling apparatus. Accordingly, there was continuously charged into the fluid energy mill apparatus about 1.8 lbs. per hour of the pelleted silica component and about 4.2 lbs. per hour of the pelleted carbon black component. A portion of the fluffy carbon black/silica composition, C(f), collected in this series having an apparent density of about 7 lbs./ft.$^3$ was then repelleted by tumbling thereof in a heated drum-type pelletizer. The resulting pelleted composition having a density of about 24 lbs./ft.$^3$ is hereinafter referred to as series C(p).

Series D constitutes an attempt to produce essentially the same results as achieved in series B and C by blending of previously fluid energy milled components. Thus, in accordance with the series D procedure, the silica component was separately fluid energy milled at a rate of about 6 lbs./hour under the same conditions as utilized in series B and C. The fluid energy milled silica was collected and there was substantially immediately thereafter charged into the fluid energy milling device the carbon black component at a rate of about 6 lbs./hour. The separately milled components were then blended in a 65 carbon black: 35 silica weight ratio in a tumble mixer in substantially the same manner as described for the production of the series A mixture. The apparent density of this product was about 4½ lbs./ft.$^3$.

Series E was essentially a duplicate of series D with the exception that only the silica component of the end item carbon black composition was fluid energy milled. This product had an apparent density of about 16 lbs./ft.$^3$.

Samples of each of the silica/carbon black compositions produced in series A–E were dispersed into a standard ASTM D-15 natural rubber formulation in accordance with a standard two-step dispersion procedure entailing an initial mixing of the rubber composition on a Banbury mixer at 150° for about 8 minutes followed by a rest or recovery period of about 16 hours followed by an additional 3-minute mixing cycle in a room temperature Banbury.

| Rubber Formulation | Parts by Weight |
| --- | --- |
| Natural Rubber | 100 |
| Sulfur | 1.5 |
| N-tert-butyl-2-benzothiazolesulfenamide | 1.5 |
| Zinc Oxide | 5 |
| Stearic Acid | 3.5 |
| Diethylene Glycol (70:30) | 1.2 |
| Carbon Black/Silica | 60 |
| Polymerized 1,2-dihydro-2,2,4-trimethyl-quinoline | 2.5 |
| Pine Tar | 6.0 |

Next, several test bars were formed and cured from each of the rubber compositions. Said test bars were then tested for DeMattia cut growth resistance in accordance with ASTM D 813-59. In addition, each of the sample vulcanized rubber test bars were microtomed into about 2 micron sections and examined microscopically. The dispersion quality of the carbon black and silica in each composition was determined microscopically. In the table following, the dispersion quality of the carbon black component was adjudged by the published test method of A. I. Medalia, *Rubber Chem. & Tech.* 34 (1961), p. 134. Silica dispersion, however, was determined by the method of Leigh-Dugmore, *Rubber Chem. & Tech.* 29 (1956), p. 1303 and is expressed in terms of volume percent of silica agglomerates in the composition of over 6.5 $\mu$.

TABLE I

| Series (two-step dispersion) | Cut growth resistance, percent of Series A ASTM D-813-59 | Dispersion rating (silica Leigh-Dugmore), percent | Dispersion rating (carbon black, Medalia) |
|---|---|---|---|
| A (standard) | 100 | <5 | B-2[1] |
| B | 400 | <5 | B-3[1] |
| C(f) | 400 | <5 | B-3[1] |
| C(p) | 300 | <5 | D-2[1] |
| D | 210 | <5 | B-2[1] |
| E | 100 | <5 | B-2[1] |

[1] In the above-recited letter/number combination ratings the lower the letter the better the dispersion, and the lower the number (within each letter class) the better the dispersion quality.

EXAMPLE 2

This example is essentially a duplicate of certain portions of example 1 with the exception that a single stage technique is utilized in dispersing the carbon black/silica composition into the natural rubber formulation rather than the two-stage technique utilized in example 1. Accordingly, the carbon black/silica compositions prepared in series A, C(f) and E of example 1 were dispersed to their final concentration (60 parts by weight per 100 parts of rubber) by Banbury mixing the ingredients for about 8 minutes at about 150° F. The resulting rubber composition was then dumped from the mixer and utilized without further mixing steps applied thereto. The resulting rubber samples were then processed and tested in the same manner as in example 1. Table II following provides a compilation of the results of these tests:

TABLE II

| Series (one-step dispersion) | Cut growth resistance (percent of series A, ASTM D-813-59) | Dispersion rating (carbon black, medalia) |
|---|---|---|
| A (standard) | 100 | B-3 |
| C(f) | 360 | B-2 |
| E | 180 | C-3 |

EXAMPLE 3

This example is essentially a procedural duplicate of example 2 with the exception that a different carbon black was utilized. Accordingly, the carbon black utilized was a SAF pelleted oil furnace carbon black having an average particle diameter of about 20 millimicrons, a BET-N$_2$ surface area of about 140 m.$^2$/gram and a dibutyl phthalate absorption factor of about 115 c.c.s. per 115 grams of black. The apparent density thereof was about 22 lbs./ft.$^3$.

In series 1 a standard composition was produced by tumble blending the pelleted carbon black and silica in a 70:30 weight ratio.

In series 2 only the carbon black component of the ultimate composition was fluid energy milled under substantially the same conditions as utilized in example 1.

In series 3 the carbon black and silica components were blended and thereafter subjected to fluid energy milling as in series B of example 1. The product composition had an apparent density of about 4¼ lbs./ft.$^3$.

Each of the carbon black/silica compositions produced in accordance with the above procedures was then dispersed into separate natural rubber formulations in accordance with the dispersion method of example 2. The resulting rubber stocks were then tested as previously described. The results of said tests are reproduced in table III.

TABLE III

| Series | Cut growth resistance (percent of Series 1, ASTM D-813-59) | Dispersion rating (silica Leigh-Dugmore), percent | Dispersion rating (carbon black, Medalia) |
|---|---|---|---|
| 1 (standard) | 100 | >40 | B3-4 |
| 2 | 100 | <5 | C-3 |
| 3 | 240 | <5 | C-3 |

Although not specifically noted in the examples presented hereinabove, one of the important features of the process and reinforcing compositions of the present invention resides in the fact that not only is the desirable rubber property of cut growth resistance substantially improved, but also that normally other essential properties of natural rubbers in general and tread stocks in particular are not diminished thereby. Accordingly, the abrasion resistance and tear strength of the rubber compositions containing the reinforcing compositions of the present invention are comparable or even somewhat improved over those containing the ordinary carbon black/silica compositions of the prior art. It has also been noted that often the heat buildup character of natural rubber compositions containing the improved reinforcing agents of the instant invention are substantially lowered as compared to compositions containing mixtures of carbon black and silica which have not undergone fluid energy milling treatment.

Obviously, many changes can be made in the above examples and description without departing from the intended scope of the invention. Thus, the natural rubber compositions produced in accordance with the teachings of the present invention can contain, in addition to the reinforcing agents of the invention and the natural rubber matrices therefor, vulcanizing agents, fillers, pigments, colorants, antioxidants, lubricants, and the like.

Further, while not specifically mentioned hereinbefore, it is contemplated that the improved rubber compositions available through the practice of the present invention can be utilized in applications other than tire tread stocks. For instance, rubber shoe sole and heel stocks are also contemplated as being useful end-use applications for the reinforced rubber compositions of the invention.

Finally, while no mention has been made of synthetic elastomeric materials, it is to be noted that the presence of relatively minor amounts (i.e. less than about 40 percent by weight of the natural rubber content) of synthetic elastomers in the natural rubber compositions of the present invention can also be utilized effectively. Accordingly, such synthetic elastomers as isoprene, Buna N, butyl, ethylenepropylene, butadiene and the like can also form part of the natural rubber compositions of the invention in order to provide further beneficial characteristics to the overall end-item composition.

Thus, it is intended that the specification be considered as descriptive only and as not limiting the scope of the invention.

What is claimed is:

1. A process for producing superior rubber reinforcing compositions which comprises:
   a. providing a mixture consisting essentially of
      i. about 10 and about 50 weight percent of a precipitated silica having a BET-N$_2$ surface area of between about 50 and about 250 m.$^2$/gram and an apparent density of above about 10 lbs./ft.$^3$, and
      ii. between about 90 and about 50 weight percent of a carbon black having a BET-N$_2$ surface area of between about 30 and about 150 m.$^2$/gram, a dibutylphthalate oil absorption factor of greater than about 50 cc./100 g. and an apparent density of greater than about 10 lbs./ft.$^3$; and b. fluid energy milling said mixture to an apparent density of less than about 9 lbs./ft.$^3$.

2. The process of claim 1 wherein said carbon black provided in step (a) is in pelleted form.

3. The process of claim 1 wherein step (a) is achieved prior to step (b).

4. The process of claim 1 wherein step (a) is achieved substantially concomitantly with step (b).

5. The process of claim 1 wherein said carbon black has a dibutylphthalate absorption factor of greater than about 70 cc./100 grams.

6. The process of claim 1 wherein said precipitated silica has a BET-N$_2$ surface area of between about 75 and about 150 m.$^2$/ gram.

7. The process of claim 1 wherein said mixture consists essentially of about 70 weight percent of said carbon black and about 30 weight percent of said precipitated silica.

8. The process of claim 1 wherein said carbon black/silica mixture is fluid energy milled to an apparent density of less than about 7 lbs./ft.$^3$.

9. The process of claim 1 wherein, subsequent to step (b), the resulting fluffy carbon black/silica product is pelletized.

10. A superior rubber reinforcing composition consisting essentially of a mixture of carbon black and precipitated silica, said carbon black having an original apparent density of greater than about 10 lbs./ft.$^3$, a BET-N$_2$ surface area of between about 30 and about 250 m.$^2$/g. and a dibutylphthalate absorption factor of greater than about 50 cc./100 g. and said precipitated silica having an original apparent density of greater than about 10 lbs./ft.$^3$, and a BET-N$_2$ surface area of between about 50 and about 250 m.$^2$/g., and which mixture has been fluid energy milled to an apparent density of less than about 9 lbs./ft.$^3$.

11. The composition of claim 9 wherein said carbon black has a dibutylphthalate absorption factor greater than about 70 cc./100 g. and said precipitated silica has a BET-N$_2$ surface area of between about 75 and about 150 m.$^2$/g.

12. A reinforced rubber composition comprising natural rubber and between about 30 and about 85 percent by weight thereof of a carbon black/precipitated silica mixture produced by fluid energy milling a mixture consisting essentially of:

a. between about 10 and about 50 weight percent of a precipitated silica having a BET-N$_2$ surface area of between about 50 and about 250 m.$^2$/g. and an apparent density of above about 10 lbs./ft.$^3$; and b. between about 90 and about 50 weight percent of a carbon black having a BET-N$_2$ surface area of between about 30 and about 150 m.$^2$g., a dibutylphthalate oil absorption factor of greater than about 50 cc./100 g. and an apparent density of greater than about 10 lbs./ft.$^3$ to an apparent density of less than about 9 lbs./ft.$^3$.

* * * * *